(12) United States Patent
Chasko

(10) Patent No.: US 6,901,373 B1
(45) Date of Patent: May 31, 2005

(54) METHOD AND APPARATUS FOR TRACKING CUSTOMER PURCHASING HABITS

(75) Inventor: Stephen J. Chasko, Flowery Branch, GA (US)

(73) Assignee: NCR Corporation, Dayton, OH (US)

(*) Notice: Subject to any disclaimer, the term of this patent is extended or adjusted under 35 U.S.C. 154(b) by 540 days.

(21) Appl. No.: 09/438,396

(22) Filed: Nov. 12, 1999

(51) Int. Cl.⁷ .............................................. G06F 17/60
(52) U.S. Cl. ....................................................... 705/14
(58) Field of Search .............................. 705/1, 14, 16, 705/18, 23

(56) References Cited

U.S. PATENT DOCUMENTS

| | | | |
|---|---|---|---|
| 5,202,826 A | | 4/1993 | McCarthy |
| 5,388,165 A | | 2/1995 | Deaton et al. |
| 5,467,269 A | | 11/1995 | Flaten |
| 5,592,560 A | | 1/1997 | Deaton et al. |
| 5,687,322 A | | 11/1997 | Deaton et al. |
| 5,708,782 A | | 1/1998 | Larson et al. |
| 5,767,896 A | | 6/1998 | Nemirofsky |
| 6,049,778 A | * | 4/2000 | Walker et al. ................. 705/14 |
| 6,189,787 B1 | * | 2/2001 | Dorf .......................... 235/380 |
| 6,266,647 B1 | * | 7/2001 | Fernandez .................... 705/14 |
| 6,327,573 B1 | * | 12/2001 | Walker et al. ................. 705/14 |

FOREIGN PATENT DOCUMENTS

GB 2304625 * 3/1997

OTHER PUBLICATIONS

"Why Smart Card Based Loyalty Programs Can Cost Less Than Magnetic Stripe Programs", http://www.cardshow.com/guide/card/loyalty.html, Dec. 27, 1998, pp. 1–2.

* cited by examiner

Primary Examiner—Jeffrey D. Carlson
(74) Attorney, Agent, or Firm—Lowe Hauptman Gilman & Berner, LLP

(57) ABSTRACT

A processor, bar code scanner, and a smart card interface at a checkout stand track customer purchase habits. The smart card includes memory storing accumulated values in each of several profit categories and a second processor for executing instructions. The first processor transfers data to and from the smart card. The smart card, while coupled to the first processor, transfers stored category values containing accumulated purchase values in each of different profit margin ranges stored to the first processor. The first processor responds to the bar code scanner to retrieve profit margin data for a purchased product carrying the bar code read by the bar code scanner. The first processor adds the retrieved profit margin data and the accumulated profit margin data transferred from the smart card to the first processor for the profit margin category that is the same as the profit margin category of the purchased product. The first processor compares the resultant sum with a predetermined value for the profit margin category of the purchased product to determine if the purchaser is to receive a reward. The first processor increments the category values by an amount in relation to the customer's purchase and profit margin information and transfers the incremented category values to the smart card.

14 Claims, 3 Drawing Sheets

METHOD AND APPARATUS FOR TRACKING CUSTOMER PURCHASING HABITS

FIELD OF THE INVENTION

The present invention relates generally to a method of and apparatus for tracking customer purchasing habits, and more particularly, to such a method and apparatus wherein a portable device with a memory tracks customer purchasing habits related to plural profit categories. Another aspect of the invention relates to a method and apparatus wherein a portable device with a memory storing customer identification and customer purchasing habits interfaces with a point of sale terminal that stores the customer information for only one customer at a time and transmits the customer information only to the portable device and modifies the stored information based on purchases by the one customer.

BACKGROUND OF THE INVENTION

Numerous approaches and business programs have been proposed and employed to track customer purchasing habits with the ultimate aim of tailoring marketing to more profitable customers in order to increase profit margins. One particular approach uses a remote central data warehouse to track customer purchasing habits. When a customer completes a purchase, information, e.g. customer identity and customer purchases, is sent to the central data warehouse for analysis. After the data stored in the data warehouse is analyzed, a reward (often in the form of a coupon or rebate) or balance statement is sent to the customer. The data warehouse is in certain instances used in combination with customer loyalty cards to identify customers and allow retailers to track customer purchasing habits on an individual basis. A typical loyalty card system employs plastic cards having a back side with either a bar code or magnetic stripe for uniquely identifying the individual cardholder. Because the central data warehouses store all customer purchasing information, the data warehouses must be quite large.

Another problem encountered with these prior art approaches is a time delay resulting from transfer of purchase information to the remote warehouses, analysis of the information at the remote warehouses, and transfer of results or feedback to the customer. Because processing of customer purchases and determination of rewards occurs at a distant location from the transaction and as part of much larger database processing, the customer does not get immediate positive feedback. As a result, customer encouragement to make more profitable purchases frequently fails and the incentive for the customer to participate in the program wanes. As the number of participants in the program grows, there is likely to be a corresponding increase in the time delay between a customer's purchase and receipt of the purchase-related reward.

Another approach uses a smart card as a customer loyalty card. The smart card, with its own processor and memory, acts as a customer identifier and as a repository for customer purchasing information. Customer purchasing information typically consists of a point total value determined by the centralized processing. In one prior art system, points awarded based on the recency, frequency, and monetary value of the customer's purchases are stored in memory on the card and at a central data warehouse. However, due to the use of remote data warehousing and analysis, this approach still entails a large delay between the time of purchase and the awarding of points. Because all the data are stored at the central data warehouse, as well as on the smart cards, there is no reduction in the size of the required data warehouse.

Each of the above approaches, (1) using a bar code or magnetic stripe card and (2) using a smart card, requires a large database for the data warehouse and entails an undesirable delay in providing feedback or rewards to the customer.

Another problem with previous approaches is protection of private customer-related data. It is becoming increasingly more important to customers that information pertaining to their purchasing habits be held in private and controlled by the customer. In the prior approaches, the information is all sent to the central data warehouse for processing and possible analysis of customer habits. Thus, the information on the card is replicated at at least one other location out of control of the customer.

SUMMARY OF THE INVENTION

Accordingly, an object of the present invention is to provide a new and improved method of and apparatus for managing customer purchase information.

Another object of the present invention is to provide a new and improved method of and apparatus for performing all processing necessary to track customer purchases simultaneously with the purchase transaction.

An additional object of the present invention is to provide a new and improved customer reward method and apparatus having immediate feedback and/or reward to the customer based on a current purchase transaction.

A further object of the present invention is to provide a new and improved customer reward method and apparatus encouraging customers to purchase high profit margin items through a system of rewards.

Yet another object of the present invention is to provide a new and improved customer reward method and apparatus particularly adapted to protect private customer information.

A further object of the present invention is to provide a new and improved customer reward method and apparatus having a relatively small database for tracking customer purchasing habits.

In accordance with a method aspect of the invention, a first processor for receiving and transmitting data is coupled to a portable device that is small enough to be carried on a person. The portable device includes memory for storing and transferring data and a second processor for executing instructions. The portable device is supplied to the first processor and transfers category values containing accumulated purchase values in each of different profit margin ranges stored in the memory on the portable device to the first processor. The first processor increments the category values by an amount in relation to the customer's purchase and profit margin information. The first processor transfers the incremented category values to the portable device.

Another aspect of the invention relates to a computer system comprising a first processor, a communication interface, and a memory coupled to the first processor. The communication interface exchanges signals between the first processor and a portable device with memory and a second processor for executing instructions. The first processor memory stores profit margin information, current sale information and sequences of instructions which, when executed by the first processor, cause the first processor to manage customer purchase information by commanding the portable device to increment a stored category value by an amount in relation to the customer's purchase and profit margin information.

In another aspect of the invention, the first processor stores customer purchase information for at most one customer at a time in the memory coupled to the first processor. A further aspect of the invention involves the first processor comparing the category value to a reward level and signaling to the customer that the reward level has been reached at the time of the customer's purchase. Preferably, the first processor also verifies that the customer is an authorized user of the portable device.

Yet another aspect of the invention relates to a portable device with a memory for storing and transferring data and with a processor for executing instructions. The portable device is small enough to be carried on a person. The memory of the portable device stores customer identifying information and category values containing accumulated purchase values in each of different profit margin ranges.

Preferably, the portable device, as part of a distributed system, responds to a communication interface for exchanging signals with a second processor and a memory storing profit margin information, current sale information, and sequences of instructions. Execution of the instructions causes the second processor to manage customer purchase information by commanding the portable device to increment a stored category value by an amount in relation to the customer's purchase and profit margin information. Preferably, the second processor compares the category values of the portable device to a reward level and signals to the customer whether the reward level has been reached at the time of the customer's purchase. The portable device preferably responds to customer verification signals.

The above and still further objects, features and advantages of the present invention will become apparent upon consideration of the following detailed description of several specific embodiments thereof, especially when taken in conjunction with the accompanying drawings.

DETAILED DESCRIPTION OF THE DRAWINGS

Figure 1:
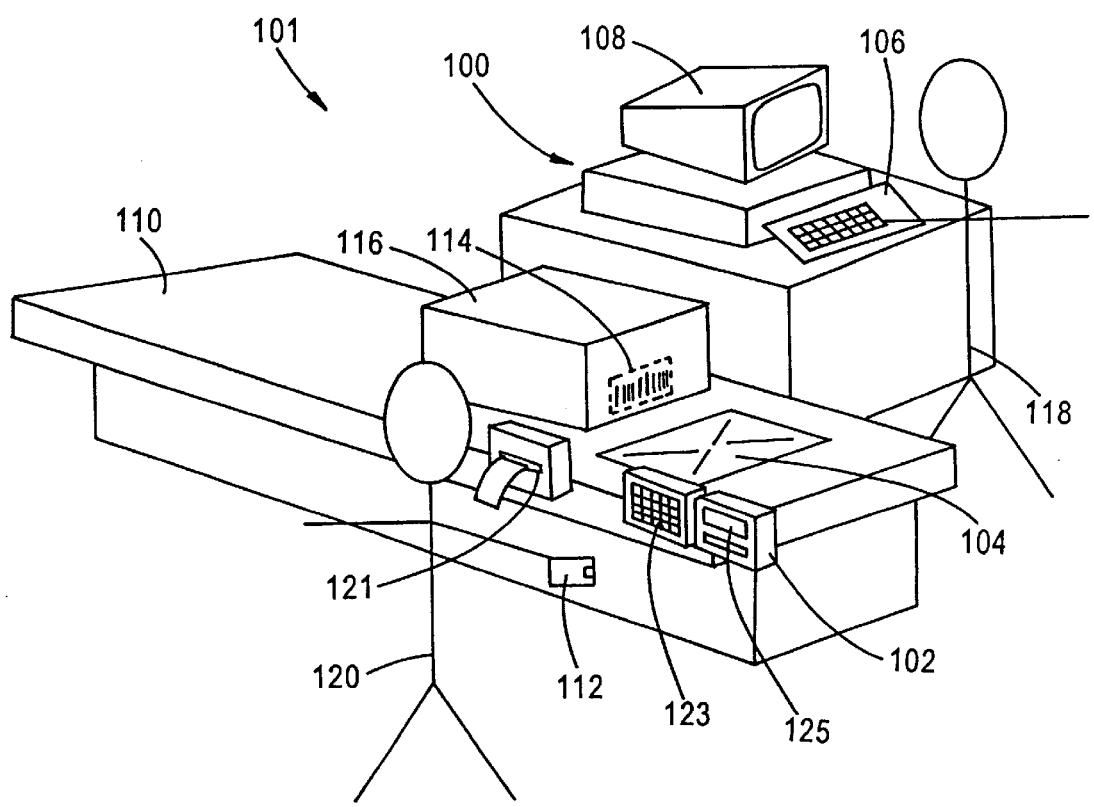
FIG. 1 is an illustration of a checkout stand including a preferred embodiment of the present invention.
Figure 2:
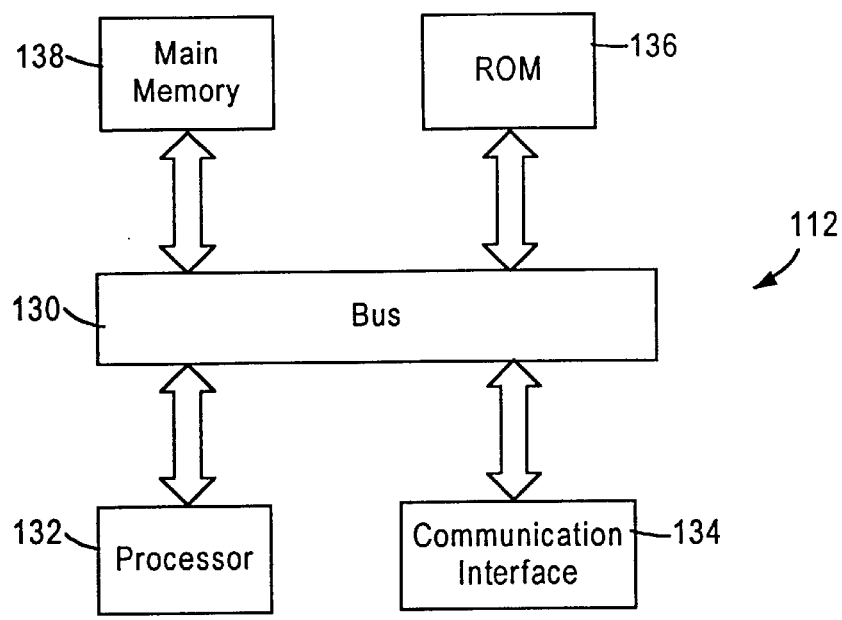
FIG. 2 is a high-level block diagram of circuitry included on the customer loyalty card of FIG. 1.

Reference is now made to FIG. 1 of the drawings wherein a checkout stand 101 includes a checkout counter 110 and a point of sale (POS) terminal 100 coupled to card interface 102 and bar code scanner 104. POS terminal 100 includes processor 164, main memory 168, read only memory (ROM) 166, storage device 170, communication interface 160, and bus 162 for connecting these structures together. POS terminal 100 further includes input device 106, preferably a keyboard for manual entry of transaction information, and electronic display 108 for displaying product information and transaction information. POS terminal 100 drives printer 121, mounted on counter 110 at stand 101, for printing a transaction receipt and/or balance statement and reward coupon. Card interface 102, mounted to counter 110, communicates with POS terminal 100 via a two way data path. Card interface 102 is adapted for physically receiving and communicating with customer loyalty card 112, preferably of the smart card type containing integrated circuitry as shown in FIG. 2. Bar code scanner 104, mounted horizontally in counter 110, scans bar code 114 when retail clerk 118 passes product 116 which carries bar code 114, in the scanner field of view. Bar code scanner 104 transmits the bar code signal to POS terminal 100 through communication interface 160 so terminal 100 is provided with a signal uniquely indicative of product 116 since bar code 114 uniquely identifies product 116.

A retail establishment including checkout counter 101 issues customer loyalty card 112 to customers to increase repeat business and generate store loyalty through a system of rewards based on customer purchasing habits. More specifically, the retailer wants to reward and thereby encourage purchasing by customers. Customer 120 carries and uses customer loyalty card 112 by inserting card 112 into card interface 102. Customer loyalty card 112 is similar in size and shape to a typical credit card, hence is small enough to be carried on a person (e.g., in a shirt pocket or wallet).

The circuitry on customer loyalty card 112, as illustrated in FIG. 2 includes bus 130 for communicating information, a processor 132 for processing information coupled with bus 130, and a communication interface 134 coupled with bus 130 for communicating with card interface 102 of FIG. 1. Communication interface 134 couples signals it reads from card interface 102 to bus 130 and signals it reads from bus 130 to card interface 102.

Customer loyalty card 112 further includes a read only memory (ROM) 136 which is coupled to bus 130 and stores static information and instructions for processor 132. Customer loyalty card 112 also includes a main memory 138, such as a non-volatile random access memory (RAM), which is coupled to bus 130 and stores information and instructions to be executed by processor 132. Main memory 138 stores customer identifying information (e.g., customer name, identification number, and pin number) and category value fields indicating the purchasing habits, inter alia, accumulated total of purchases at various profit margins, of customer 120.

Figure 3:
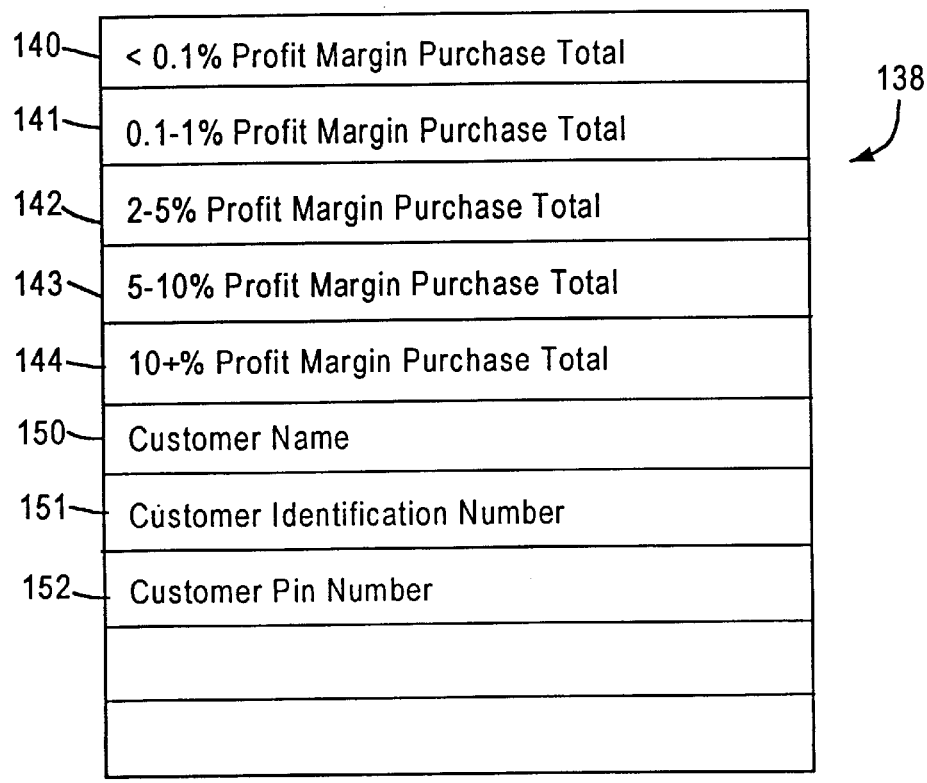
FIG. 3 is an illustration of the contents of a sample portion of memory of the customer loyalty card of FIG. 2.

FIG. 3 is an illustration of the contents of a sample portion of main memory 138 of customer loyalty card 112. Main memory 138 contains (1) customer identifying information fields 150–152, respectively indicative of customer name, identification number, and pin number, and (2) category value fields 140–144 which indicate the total purchases since the last time a reward was made by the card holder in different profit margin categories. Category value fields 140–144 include <0.1% profit margin purchase total field 140, 0.1–1% profit margin purchase total field 141, 2–5% profit margin purchase total field 142, 5–10% profit margin purchase total field 143 and 10+% profit margin purchase total field 144. POS terminal 100 uses customer identifying information fields 150–152 to verify that customer 120 is an authorized user of customer loyalty card 112.

In response to customer 120 inserting card 112 into card interface 102, the card interface transmits signals from fields 140–144 and 150–152 to main memory 168 of POS terminal 100 via a communication link (not shown) that can be a cable or wireless link coupled to communication interface 160. Customer verification occurs when customer 120 enters his pin number by activating keys on keyboard 123 next to card interface 102 in response to a pin number request displayed at display 125 on card interface 102. POS terminal 100 supplies a signal commanding display of the pin number request on display 125 in response to clerk 118 activating a sequence of keys on keyboard 106. When customer 120 enters his pin number into keyboard 123, card interface 102 transmits a signal indicative of the pin number to processor 164 of POS terminal 100 via communication interface 160 and bus 162. Processor 164, upon receiving the pin number signal customer 120 enters into keyboard 123, compares the keyed pin number to the pin number in field 152 obtained from customer loyalty card 112 and indicates the comparison result to clerk 118 through display 108 via bus 162.

As previously mentioned, category value fields 140–144 of card 112 store the accumulated purchase value of goods bought by customer 120, preferably since the last reward, in each of five different profit margin ranges. Broadly category value fields 140–144 include information connotative of the purchasing habits of customer 120. Categories can differ for each use; for one particular use, the retailer seeks to reward high profit margin purchasing. In such a situation, category value fields 140–144 contain signals respectively indicative of accumulated purchases by consumer 120 in five different profit margin categories. In each category, values are usually accumulated from the time the customer was last rewarded for the particular category to the present. However, it is to be understood the accumulation can be on other bases, e.g., from the time the card was issued to customer 120 to the present or from a previous time certain to the present. The retailer tailors the categories to encourage purchasing habits of customer 120.

Consider the example of a customer purchasing four items: one $20 product at a 3% profit margin, two $50 products at a 9% profit margin, and one $10 product at a 4% profit margin. Using category ranges as shown in FIG. 3, customer 120 using customer loyalty card 112 for the first time has category value fields 140–144 on the card updated as follows: 2–5% profit margin purchase total field 142 contains a value of $30 and 5–10% profit margin purchase total field 143 contains a value of $100. Each category value field 140–144 contains the total purchase value of goods in each of the profit margin ranges associated with the particular field 140–144. Each category value field 140–144 is independently incremented; if only one of category value fields 140–144 is changed, then only one of category value fields 140–144 is incremented. Selectively updating of only changed values requires less data transfer to customer loyalty card 112 and results in shorter total data transfer times and faster feedback to customer 120 than complete updatings. The profit margin ranges depicted in fields 140–144 are representative values only; the actual ranges can vary depending on the particular retailer. When the customer initially receives customer loyalty card 112 from the retailer, main memory 138 already contains customer identifying information 150–152 and default category value fields 140–144.

A typical modern supermarket checkout system, e.g., the checkout stand 101 of FIG. 1, includes card interface 102. Card interface 102 provides a two-way data path between customer loyalty card 112 and POS terminal 100. Card interface 102 includes display 125 and keyboard 123 for customer 120 entry of pin number for verification.

Prior to checkout, customer 120 inserts customer loyalty card 112 into card interface 102 of checkout stand 101 to redeem unused rewards and/or to obtain a balance statement from printer 121 indicating the total values in category value fields 140–144 on card 112. Upon receiving card 112, card interface 102 transmits a signal to POS terminal 100. Upon receiving the signal, POS terminal 100 transmits a request signal to card interface 102 to command reading data from customer identifying information fields 150–152 and category value fields 140–144. Card interface 102 relays the POS terminal 100 request signal to processor 132 on card 112 via communication interface 134. Upon receiving the request signal from card interface 102, processor 132 reads customer identifying information fields 150–152 and category value fields 140–144 of main memory 138. The data read from fields 140–144 and 150–152 are then transmitted to card interface 102, thence to POS terminal 100. After POS terminal 100 successfully verifies customer 120, the POS terminal performs reward determination as described later and transmits category values to printer 121 and/or display 125.

At checkout time, main memory 168 of POS terminal 100 responds to scanner 104 to store signals representing the values of accumulated purchases of customer 120 in each of profit margin ranges corresponding with fields 140–144 for purchases the customer made for the current transaction. Customer 120 inserts customer loyalty card 112 into card interface 102 of checkout system 101 causing memory 168 to store the values in fields 140–144 of card memory 138. POS terminal 100 reads the current transaction values from memory 168 and the accumulated values just previously read from card memory 138 and written into memory 168 into processor 132 that adds the values for each category that have just been read from memory 168. Processor 132 thereby increments category value fields 140–144 based on the current transaction and returns the incremented values to fields 140–144 of card memory 138 via POS terminal communication interface 160, card interface 102 and card communication interface 134. In the preferred embodiment, POS terminal 100 transmits only the category values which have been changed to category value fields 140–144 of card 112 via card interface 102. To minimize the size requirements of memory 168 and provide comfort for many customers the same portion of memory 168 where the data for customer 120 are stored is used for the next customer who presents a loyalty card so the same information that is in card memory fields 140–144 of a particular card is not permanently stored at POS terminal 100 nor any computer system coupled with it.

Figure 4:
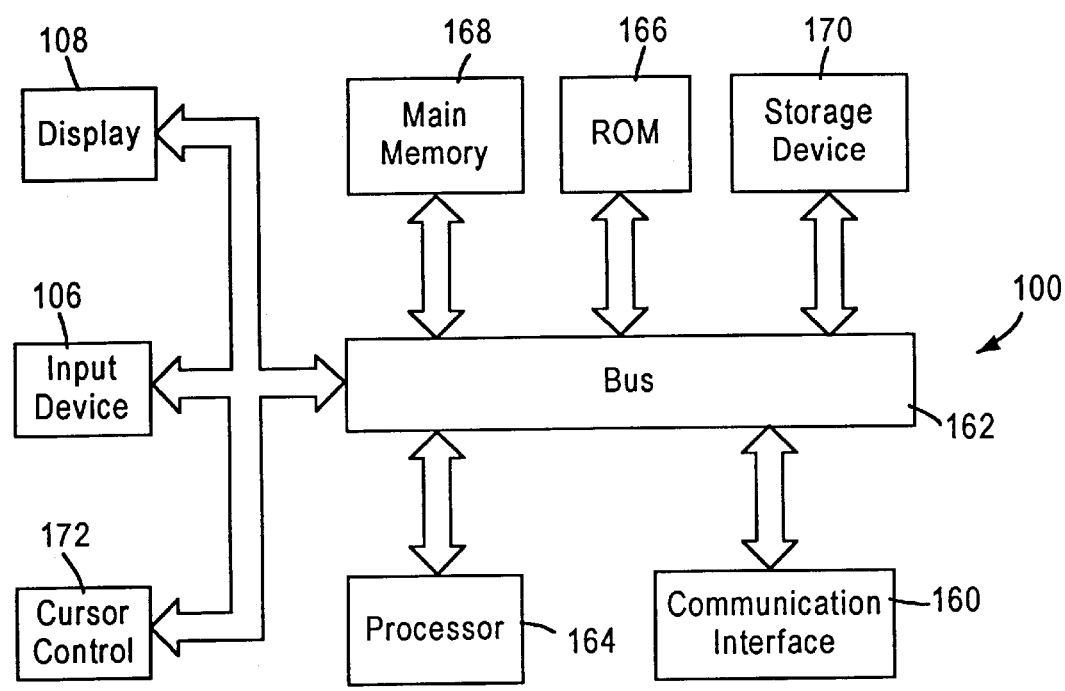
FIG. 4 is a high-level block diagram of circuitry included in a point of sale terminal included in FIG. 1.

Greater consideration is now given to FIG. 4, the block diagram of POS terminal 100 depicted in FIG. 1. POS terminal 100 includes bus 162 for communicating information and processor 164 coupled with bus 162 for processing information. POS terminal 100 also includes read only memory (ROM) 166 or other static storage device coupled to bus 162 for storing static information and instructions for processor 164. POS terminal 100 further includes main memory 168, such as a random access memory (RAM) or other dynamic storage device, coupled to bus 162 for storing instructions to be executed by processor 164, product information, category reward levels, and category values from category value fields 140–144 of customer loyalty card 112. In an alternative embodiment, processor 132, ROM 136 and main memory 138 of card 112 are arranged so category value fields 140–144 are directly incremented and decremented on customer loyalty card 112 by POS terminal 100 through card interface 102. Main memory 168 can also be used for storing temporary variables or other intermediate information while processor 164 executes instructions. Storage device 170, such as a magnetic disk or optical disk, coupled to bus 162 stores processing instructions, product information and category reward levels. Product information is retrieved in response to bar code signals from bar code scanner 104. Product information includes product name, price, and one or both of profit margin and profit margin range or category, as stored in fields 140–144.

Category reward levels include values corresponding to each category value field 140–144 of customer loyalty card 112. The retailer sets the different category reward levels as a function of the accumulated purchases in each category as to when a customer is to receive a reward. Customer 120 is due a reward when the accumulated purchases in each category value field 140–144 of customer loyalty card 112 meet or exceed the corresponding category reward level. When the reward level for a particular category is reached, POS terminal processor 164 responds to a comparison of the reward level set in storage device 170 and the accumulated value in memory 168 or processor 164 to transmit a signal via bus 162 to display 108. Clerk 118 then tells customer 120 a reward is available. Customer 120 then advises clerk 118 whether he/she wants to use the reward immediately or wait to redeem it at a later time. Upon customer 120 choosing to use the reward, clerk 118 activates a key or keys on input device 106 indicating category value field reward use whereby the input device transmits a corresponding signal to POS terminal 100. Customer 120 receives immediate reward notification at the time of product purchase by processor 164 supplying a reward use signal via bus 162 and communication interface 160 to printer 121 at checkout stand 101 to cause the printer to print a reward coupon. Processor 164 can also supply signals to printer 121 to activate the printer to produce a balance statement indicating category values 140–144.

In response to the reward use signal, POS terminal 100 decrements the corresponding category value in main memory 168 by an amount in relation to the category reward level and transmits the decremented category value to communication interface 134 of customer loyalty card 112 via card interface 102. Upon receiving the decremented category values, processor 132 of card 112 overwrites the category value fields or fields 140–144 of main memory 138 to reflect the decremented category value or values from main memory 168 of POS terminal 100.

The retailer sets the category reward levels to reward specific purchasing habits of customer 120. The category reward level for category value field 140 (<0.1% Profit Margin Purchase Total) can be set high in relation to category reward level for category 144 (10+% Profit Margin Purchase Total) to try to influence customer 120 to buy higher profit margin products. In this manner, customers purchasing higher profit margin products obtain rewards more quickly than customers purchasing low profit margin products. A retailer desiring to reduce high profit margin product inventory can lower the category reward level corresponding to category 144, for example from a $200 level to a $100 level. Consider the example of a reward system giving customer 120 a reward coupon equal in discount percentage to the profit margin category value at which the products were purchased, wherein customer 120 purchasing $200 worth of category 144 products receives two rewards including two coupons each with a 10% discount percentage. Such a reward system is a positive reinforcement for customer 120 to purchase more category 144 products.

POS terminal 100 is coupled via bus 162 to a display 108, such as a cathode ray tube or a flat panel display, for displaying information to clerk 118 and customer 120. Display 108 also indicates customer rewards. Input device 106, preferably a keyboard, including alphanumeric and function keys, is coupled to bus 162 to enable clerk 118 to communicate information and command selections to processor 164. Input device 106 also enables clerk 118 to enter bar code information manually into processor 164. Cursor control 172, such as a mouse, a trackball, or cursor direction keys, enables clerk 118 to communicate direction information and commands to processor 164 to control cursor movement on display 108.

Processor 164 executes sequences of instructions contained in main memory 168. Such instructions are read into main memory 168 from another computer-readable medium, such as storage device 170. However, the computer-readable medium is not limited to devices such as storage device 170. For example, the computer-readable medium can include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium a computer can read. Execution of the sequences of instructions contained in main memory 168 causes processor 164 to perform the process steps described below. In alternative embodiments, hard-wired circuitry can be used in place of or in combination with software instructions to perform the steps necessary to accumulate numerical values in fields 140–144 and control POS terminal 100. Thus, embodiments of the invention are not limited to any specific combination of hardware circuitry and/or software.

POS terminal 100 also includes a two-way data communication interface 160 coupled to bus 162. For example, communication interface 160 can be a serial port or a parallel port. In the preferred embodiment, communication interface 160 is coupled to card interface 102 and bar code scanner 104. POS terminal 100, through communication interface 160, receives bar code signals from bar code scanner 104 and customer identifying information 150–152 and category values from category value fields 140–144 of customer loyalty card 112 via card interface 102. POS terminal 100 uses bar code signals from bar code scanner 104 to lookup product information in main memory 168 or on storage device 170.

An exemplary sequence of steps is useful in describing the operation of the customer purchase information management system of FIG. 1. Customer 120 places a product 116 on counter 110 and inserts customer loyalty card 112 into card interface 102 at POS terminal 100. Card interface 102 requests customer verification by sending a request signal to attached display 125 and customer 120 enters its pin number using numeric keys on card interface 102. Card interface 102 communicates with customer loyalty card 112 to obtain customer identifying information 150–152 and category values 140–144 from main memory 138 of customer loyalty card 112. Card interface 102 transmits customer 120 entered pin number and customer identifying information in fields 150–152 and category values in fields 140–144 to POS terminal 100 for processing.

Upon receipt of customer entered pin number and pin number field 152 from main memory 138 of customer loyalty card 112, POS terminal 100 compares the pin numbers for verification of customer 120. Upon a successful comparison or match, POS terminal 100 calculates whether any of category value fields 140–144 meet or exceed the corresponding category reward level and indicates the result to customer 120. This indication is in the form of a result signal transmitted to display 108 via bus 162 and/or a receipt printed at POS terminal 100 indicating the result. A failed comparison or lack of a match halts the process and results in no change to the category value fields 140–144.

Clerk 118 at POS terminal 100 uses bar code scanner 104 to scan bar code 114 on product 116. Bar code scanner 104 transmits the bar code signal to communication interface 160 of POS terminal 100 so POS terminal 100 can obtain information about the product carrying the scanned bar code. Upon receipt of the bar code signal, communication interface 160 of terminal 100 transmits the bar code signal via bus 162 to processor 164. Processor 164 responds to the bar code signal to search main memory 168 and storage device 170 for product information corresponding to bar code 114. Product information includes one or both of profit margin and profit margin category. Processor 164 accumulates any additional costs (e.g., taxes) and transmits the total price to display 108 via bus 162. Processor 164 accumulates customer purchases by one or both of profit margin and profit margin category in main memory 168.

After customer 120 has completed the purchase of product 116, POS terminal 100 uses the product information obtained from memory 168 or storage device 170 in response to scanner 104 responding to bar code 114 to increment category values in main memory 168. In an alternative embodiment, POS terminal 100 uses the product information obtained from memory 168 or storage device 170 to directly increment category values 140–144 in main memory 138 on customer loyalty card 112.

POS terminal 100 calculates whether any of main memory category values meet or exceed the corresponding category reward level and indicates the result to customer 120. This indication is in the form of a result signal transmitted to display 108 via bus 162 and/or a receipt printed at POS terminal 100 indicating the result. POS terminal 100 transmits incremented category values from main memory 168 as appropriate to card interface 102. Upon receipt of incremented category values from POS terminal 100, card interface 102 communicates incremented main memory category values to communication interface 134 of customer loyalty card 112. Communication interface 134 receives signals indicative of incremented category values and transmits the signals to processor 132 via bus 130. Upon receipt of an incremented category value signal from communication interface 134, processor 132 overwrites the corresponding category value fields 140–144 of main memory 138 to reflect the incremented category value signal contents.

It should now be apparent that a method of and apparatus for managing customer purchase information have been described. The present invention captures the profit margin of the customer's total purchases on customer loyalty card 112. Additionally, while the profit margin determination and updating of customer loyalty card 112 occurs on POS terminal 100 at the time of the transaction, it is to be understood that profit margin determination and accumulation of category value fields 140–144 of customer loyalty card 112 can occur on customer loyalty card 112. Customer reward determination occurs at the time of the transaction.

While there have been described and illustrated specific embodiments of the invention, it will be clear that variations in the details of the embodiments specifically illustrated and described may be made without departing from the true spirit and scope of the invention as defined in the appended claims.

What is claimed is:

1. A computer system for managing customer purchase information comprising:
   a first processor for receiving and transmitting data;
   a communication interface adapted to exchange signals between the first processor and a portable device small enough to be carried on a person, wherein the portable device includes memory and a second processor for executing instructions; and
   a memory coupled to said first processor; the memory having stored therein profit margin information of a customer purchase of at least one product having a profit margin, current sale information, and sequences of instructions which, when executed by said first processor, cause said first processor to manage customer purchase information by causing said first processor to command said second processor to execute instructions to cause the memory of the portable device to increment a stored category value by an amount in relation to the customer purchase information and a profit margin information of the customer purchase.

2. The computer system of claim 1, wherein the memory coupled to said first processor stores instructions causing said first processor to store customer purchase information for at most one customer at a time.

3. The computer system of claim 1, wherein the memory coupled to said first processor stores instructions causing said first processor to compare said category value to a reward level and signal whether the reward level has been reached.

4. The computer system of claim 3, wherein the memory coupled to said first processor stores instructions causing said first processor to compare said category value to a reward level and signal whether the reward level has been reached at the time of customer's purchase.

5. The computer system of claim 1, wherein the memory coupled to said first processor stores instructions causing said first processor to verify said portable device is being used by an authorized user.

6. The computer system of claim 1, wherein the memory coupled to said first processor stores instructions causing said first processor to respond to a bar code signal indicative of a purchased product supplied by a bar code scanner by retrieving information from said memory of said first processor for profit category in response to said bar code signal.

7. A method of managing customer purchasing habits related to profit margin categories by using a first processor with memory for receiving and transmitting data, said first processor being coupled to a portable device with (a) memory for storing and transferring category values containing accumulated purchase values in each of different profit margin ranges and (b) a second processor for executing instructions, said portable device being small enough to be carried on a person, said first processor being able to transfer data with said portable device, comprising the steps of: determining an accumulated purchase value in each of different profit margin ranges based on a customer purchase of at least one product having a profit margin;
   supplying said portable device to said first processor;
   transferring to said first processor category values containing accumulated purchase values in each of different profit margin ranges stored in said memory of said portable device;
   said first processor incrementing said category values by an amount in relation to the determined accumulated purchase value; and
   transferring said incremented category values from said memory of said first processor to the memory of said portable device.

8. The method of claim 7, wherein said first processor stores customer purchase information for at most one customer at a time in said memory coupled to said first processor.

9. The method of claim 7, further comprising the step of said first processor comparing said category value to a reward level indicative of an accumulated purchase value for a profit margin range and signaling whether the reward level has been reached.

10. The method of claim 9, wherein the step of said first processor comparing said category value to a reward level and signaling whether the reward level has been reached occurs at the time of customer's purchase.

11. The method of claim 7, further comprising the step of said first processor verifying that customer is an authorized user of said portable device.

12. The method of claim 7, further comprising the step of a bar code scanner supplying a bar code signal to said first processor indicative of a purchased product and said first processor retrieving information from said memory of said first processor for profit category in response to said bar code signal.

13. A retail checkout stand for use with portable devices having a size corresponding with a credit card, each portable device having a memory storing customer identification information and previous purchase information, comprising: a bar code scanner for deriving a product indicating signal in response to a bar code associated with a purchased item, a card interface unit adapted to respond to signals from the portable devices, a keyboard for enabling the customer to enter customer identification information corresponding with the customer identification information stored in the portable device, and a processor coupled with the bar code scanner, the card interface unit and the keyboard, the processor including a memory storing first signals indicative of retailer information about each item having a bar code and signals commanding the processor to (a) compare the customer identification information derived from the keyboard with the customer identification information derived from the portable device, (b) in response to (a) indicating a correlation between the customer identification information derived from the keyboard with the customer identification information derived from the portable device, read the retailer information about the purchased item in response to the bar code scanner, deriving a signal indicative of the bar code indication derived by the bar code scanner, (c) combine the previous purchase information read by the card interface unit with the read retailer information about the item to derive a combined signal, (d) selectively supply the combined signal to the card interface unit for coupling to the portable device, (e) derive a reward signal in response to a comparison of the combined signal with a predetermined value, the memory and the processor being arranged so that the memory never stores a combined signal for more than one of said items and supplies the combined signal only to the card interface unit and thence to the same portable device as the portable device which previously supplied previous purchase information to the processor via the card interface unit.

14. A retail checkout stand for use with portable devices having a size corresponding with a credit card, each portable device having a memory storing customer identification information and previous profit margin information in plural profit margin categories comprising: a bar code scanner for deriving a product indicating signal in response to a bar code associated with a purchased item, a card interface unit adapted to respond to signals from the portable devices, a keyboard for enabling the customer to enter customer identification information corresponding with the customer identification information stored in the portable device, and a processor coupled with the bar code scanner, the card interface unit and the keyboard, the processor including a memory storing first signals indicative of profit margin category for each item having a bar code and signals commanding the processor to (a) compare the customer identification information derived from the keyboard with the customer identification information derived from the portable device, (b) in response to (a) indicating a correlation between the customer identification information derived from the keyboard with the customer identification information derived from the portable device, read the profit margin category for the purchased item in response to the bar code scanner, deriving a signal indicative of the bar code indication derived by the bar code scanner, (c) combine the previous profit margin information in plural profit margin categories read by the card interface unit with the read profit margin category for the item to derive a combined signal, (d) selectively supply the combined signal to the card interface unit for coupling to the portable device, (e) derive a reward signal in response to a comparison of the combined signal with a predetermined value.

* * * * *